(No Model.) 2 Sheets—Sheet 1.
A. H. EMERY.
WEIGHING MACHINE AND DYNAMOMETER.
No. 278,913. Patented June 5, 1883.
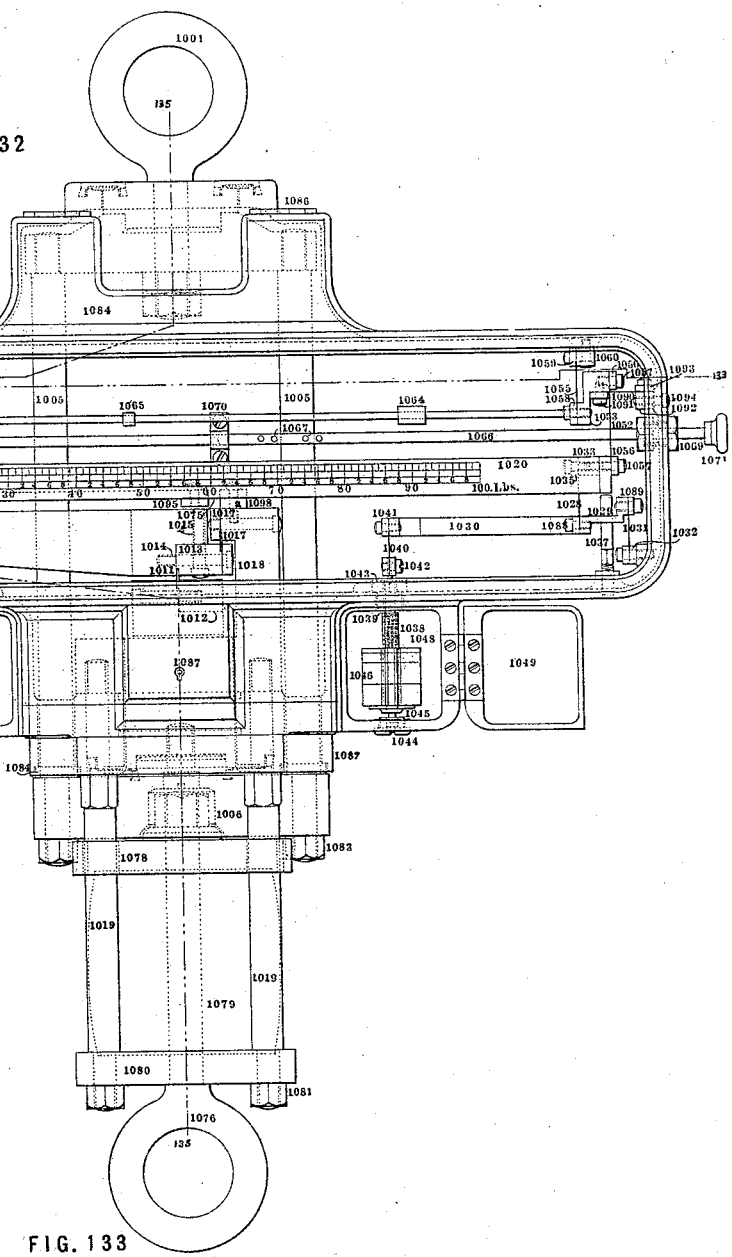
FIG. 132
FIG. 133
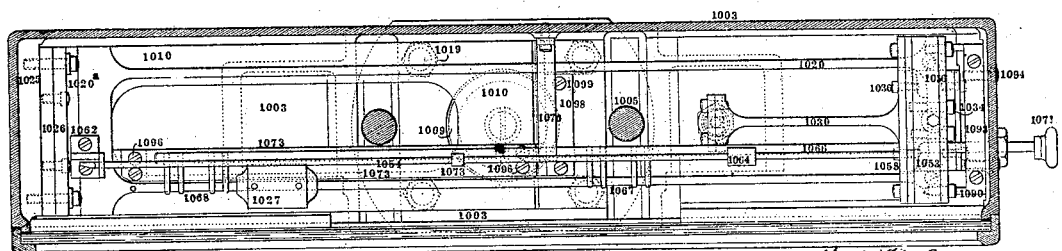
WITNESSES Walter Allen, Harry E. Knight
INVENTOR — Albert H. Emery
By Knight Bros
Attys
N. PETERS, Photo-Lithographer, Washington, D. C.

(No Model.) 2 Sheets—Sheet 2.
A. H. EMERY.
WEIGHING MACHINE AND DYNAMOMETER.
No. 278,913. Patented June 5, 1883.
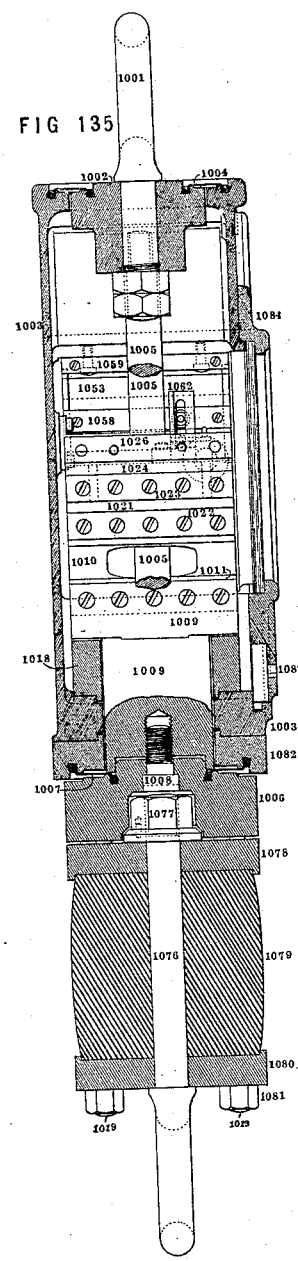
FIG 135
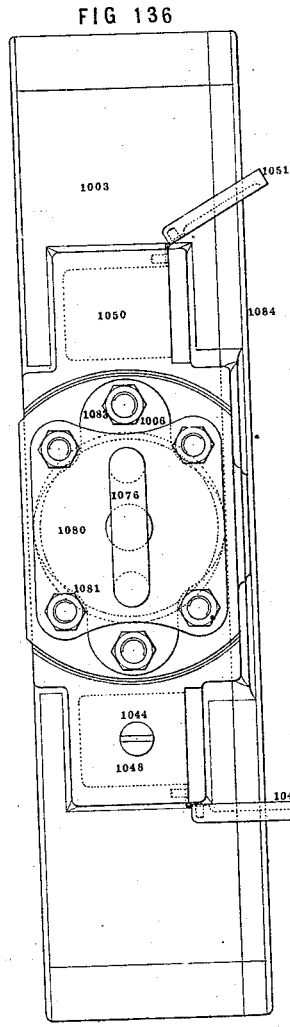
FIG 136
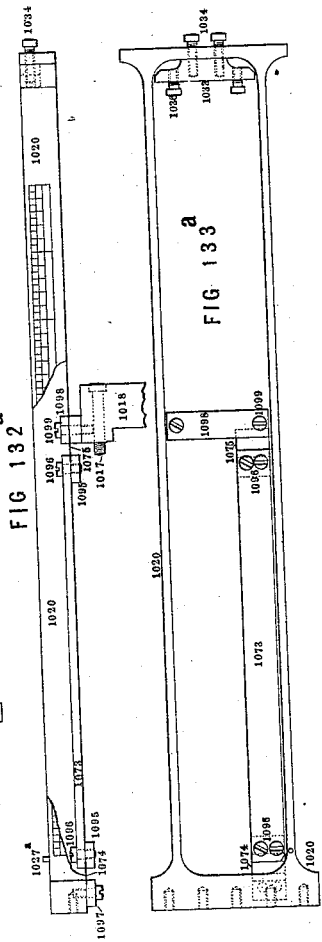
FIG 132ᵃ  FIG 133ᵃ
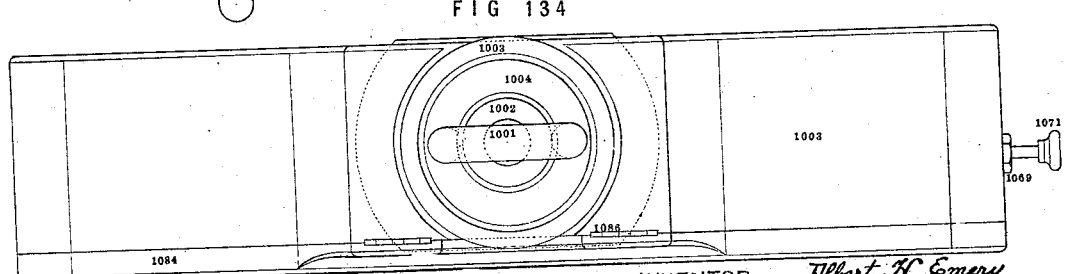
FIG 134
WITNESSES  Walter Allen  Harry E. Knight
INVENTOR Albert H. Emery
BY Knight Bros. Attys

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

WEIGHING-MACHINE AND DYNAMOMETER.

SPECIFICATION forming part of Letters Patent No. 278,913, dated June 5, 1883.

Application filed February 5, 1881. (No model.)

*To all whom it may concern:*

Be it known that I, ALBERT H. EMERY, of the city, county, and State of New York, have invented certain new and useful Improvements in Weighing Machinery and Dynamometers, of which the following is a specification.

The subject of my invention is a portable weighing-machine possessing great accuracy and capable of being made of large capacity, adapted to be suspended for use, and adapted also to serve the purposes of a dynamometer for weighing and indicating vertical strains. The dynamometer is suspended by a stem attached to a beam, which is connected by tie-rods to a lower beam, to which is screwed a column bearing, through a flexible transmitting-plate, against the first of a series of weighing-levers, which are connected to the case and to each other by flexible plates. The load is applied to the case through the medium of a load-stem and a pair of cross-heads, between which a spring is interposed to counteract any sudden shocks. Flexible plates are also employed to stay the levers against horizontal movement. The second lever of the series carries a sliding weight for use in connection with graduations on the beam, and is connected with a supplemental lever, from the end of which a bar is suspended for the reception of large poise-weights for weighing heavy loads. The suspension-weight rod works through a guiding-opening in the case, and is formed with a shoulder to limit its upward movement. An adjustable stud within the case serves as a stop to limit the descent of the connected levers, and by passing through the fulcrum-piece of the third lever limits the horizontal motion thereof. The second lever is fixed against longitudinal motion by a horizontal flexible plate which permits its free vertical play. The second lever also connects with an indicator-rod having much greater angular motion and carrying one or more sliding tare or balancing weights. By means of a rod or rods sliding in packed guides or boxes in the case all the sliding weights are operated without opening the case. The case is constructed on one side with a pocket for the reception of the heavy poise-weights when not in use, and on the opposite side with a corresponding pocket, within which the rod for the reception of said weights hangs from the supplemental weight-lever. The entire gravity of the machine and its appendages, which is balanced by tare or counter balance weights, is thus unchanged by the application of weights to the weight-lever or their removal therefrom.

The invention is represented in the accompanying drawings by seven figures, numbered 132 to 136, inclusive. Figure 132 is a front elevation of the machine complete for operation. Fig. 132ª is an elevation of a lever stay-bar and its attachments. Fig. 133 is a horizontal section of the machine on the horizontal broken line in Fig. 132. Fig. 133ª is a plan of the lever and its stay-bar and attachments. Fig. 134 is a plan of the machine. Fig. 135 is a vertical section on the irregular broken lines in Fig. 132. Fig. 136 is a bottom view.

1001 is a suspension-stem attached to a suspension-beam, 1002, which is stayed horizontally within the upper part of the case 1003 by flexible plate or plates 1004, permanently connected to each, and allowing free vertical movement of the case relatively to the beam. The beam 1002 is connected by shouldered tie-rods 1005 with a load-beam, 1006, at the bottom of the case, which is clamped against the shoulders of the tie-rods by nuts 1083, and is stayed horizontally by flexible fixing-plates 1007, secured to it and to the casing-ring 1082, permitting free vertical play to the case and beam. The parts 1001, 1002, 1005, and 1006 thus constitute a rigid yoke in and around which the case and its attachments move up and down in weighing. The tie-rods pass loosely through the case, the annular space between them and the case being closed by rubber or other elastic rings, 1084, placed in recesses in the casing-ring 1082.

To the load-beam 1006 is attached, by a screw, 1008, a pressure-column, 1009, which is connected with a load-lever, 1010, by a flexible transmitting-plate, 1011, clamped to the column by a block and screws 1012, (shown in dotted lines in Fig. 132,) and to the load 1010 by a block, 1013, fixed thereto by screws 1014 1015. The horizontal screws 1014 also attach a clamp-plate, 1016, which holds a flexible fulcrum-plate, 1017, which is clamped at its upper edge, by a plate and screw, 1017ª, to a stationary block or bracket, 1018, fastened to the case by shouldered bolts 1019, which also fix the casing-ring 1082 to the case. The block 1018 is made of annular form at its lower part, so as to allow the column 1009 to work freely up and down within it. The primary load-lever 1010 is connected at its free end to the fulcrum-block 1020ª of a second lever, 1020, by a flexible transmitting-plate, 1021, clamped to the end of the lever 1010 by clamp-plate and screws 1022. The screws attaching the fulcrum-block 1020ª hold also a clamp-plate, 1023, securing the lower end of a thin flexible plate, 1024, which fulcrums the lever 1020 to a bracket, 1025, within the case, being clamped to said bracket by clamp-plates and screws 1026.

The load-levers 1010 and 1020 are made in double form, each consisting of a quadrangular frame, or of two parallel bars permanently connected at their ends by transverse bars, to which the fulcrum and transmitting plates of the respective levers are attached. The front bar of the lever 1020 is graduated, as shown in Fig. 132, with a scale for use in connection with a sliding weight, 1027, which is stopped at zero by a stud, 1027ª, on said bar. The rear bar of the said lever may carry one or more tare or balancing weights, if desired. The thin-plate connections which receive strains of compression are made the entire width of the double levers. The free end of the lever 1020 connects by thin flexible plates 1028 with an upwardly-projecting fulcrum-block, 1029, bolted to a second weight-lever, 1030, and fulcrumed by a thin flexible plate, 1031, attached by clamp-plates and screws 1032 to a lug on the case.

1033 is an attaching-block (shown in dotted lines in Figs. 132, 133, and 132ª, and in full lines in Fig. 133ª) secured to the lever 1020 by two screws, 1034. To this block the connecting-plates 1028 are clamped by a plate, 1035, (shown in dotted lines,) fixed by two screws, 1036. The lever 1030 is branched at each end, as shown in Fig. 133, and is attached to its fulcrum-block 1029 by screws 1088, which serve also to clamp the lower ends of the connecting-plates 1028. The fulcrum-plates 1031 are attached to the fulcrum-block 1029 by a clamp-plate and screws, 1089. An adjustable stud, 1037, projecting upward within the case through an aperture in the fulcrum-block 1029, forms a stop to limit the descent of the connected levers 1020 1030 by the contact of the former with the upper end of said stud, and also limits the horizontal movement of the lever 1030, so as to prevent injury to its flexible-plate connections. From the free end of the lever 1030 a weight-rod, 1038, is suspended by a flexible plate, 1040, clamped to the lever and weight-rod, respectively, by plates and screws 1041 1042. The suspended weight-rod 1038 passes loosely through an opening in the case, in which, in the present illustration, is a hollow screw, 1043. The contact of the shoulder 1039 of the weight-rod with the bottom of this screw limits the upward movement of the connected levers. The lower end of the rod hangs freely in a socket, 1044, which restricts it against swinging motion.

A platform, 1045, on the suspension-rod 1038, supports weights 1046, which are applied thereto to balance heavy loads. Similar weights are shown at 1047 set away, as when not in use. The weight-rod 1038 is graduated, as shown in Fig. 132, so that the value of the weights upon it at any time may be read directly over the top of said weights. The weight-rod 1038 hangs within a box or pocket, 1048, closed by a hinged door, 1049. A corresponding box or pocket, 1050, on the opposite side of the case receives such of the weights as are not in use. The pocket 1050 is closed by a door, 1051. The weights not in use are kept in the case, as shown, so that the entire gravity of the machine and its appendages, which must be balanced before the application of a load, may not vary in the operation of weighing. The weight-rod 1038 may hang directly on the end of the lever 1020, if preferred. The lever 1020 is connected at its free end by a thin flexible plate, 1052, with the fulcrum-block 1053 of an indicator-rod, 1054. The said fulcrum-block is suspended within the case by thin flexible fulcrum-plates 1055. The connecting-plate 1052 is attached at its respective ends to the end of the lever 1020, and to the fulcrum-block 1053 by clamp-plates 1056, each fixed by two screws, 1057.

1058 and 1059 represent clamps for attaching the suspension-plate 1055 to the indicator fulcrum-block 1053, and to the attaching-block 1060, which is fastened by a screw to a lug on the case. The indicator fulcrum-block 1053 is fixed against longitudinal motion by one or more thin flexible plates, 1090, secured at one end to the fulcrum-block by a clamp-plate and screws, 1091, and at the other end to an attaching-block, 1092, by clamp-plate and screws 1093. The attaching-block 1092 is fastened to a lug in the case by screws 1094.

The connecting and fulcrum plates 1028, 1031, 1040, 1052, 1055, and 1090, which are under tension, are preferably applied in pairs, each consisting of two narrow spring-plates.

The transmitting and fulcrum plates 1011 1017 1021 1024, which sustain strains of compression, are preferable made, each in one piece, the full width of the double levers.

The indicator-rod 1054, at its free end, plays without contact within a slotted guide and stop plate, 1061, and in front of a graduated indicator-plate, 1062. The guide-plate is attached to the indicator-plate by a screw, 1100, and the indicator-plate is attached by screws 1063 to the lever 1020, near its fulcrum end. The rod 1054 may be connected by a band with a rotary indicator, as described in another application. The indicator-rod carries any desirable number of tare or balancing weights, 1064 1065. One of these—1065, for example—is preferably made of aluminum or other light material for delicate balancing. The sliding weight or weights 1027 on the lever 1020 and the sliding balancing-weights 1064 1065 are all operated by means of a sliding tappet-rod, 1066, so as to avoid the necessity of opening the case. The rod works within stuffing-boxes or packed guides 1069 1070, and carries two sets of tappets or fingers, 1067 1068, working on either side of the guide 1070. It is furnished at its outer end with a knob, 1071, for prehension. The weight 1027 is preferably provided with an upwardly-projecting pair of studs, 1072, either of which may be engaged by the respective fingers 1067 1068 on the sliding rod, so that the weight may readily be moved the entire length of the beam, when required, by two holds, though the stroke of the rod 1066 is limited to one-half its length by the inner guide, 1070.

The weight-lever 1020 is secured against longitudinal motion by a bar, 1073, Figs. 132ª, 133ª, (shown in dotted lines in Fig. 132,) attached to the said lever, near the fulcrum end thereof, through the medium of a thin flexible plate, 1074, and to the fulcrum-bracket or other stationary part of the case through the medium of a thin flexible plate, 1075. The flexible plates 1074 and 1075 are fixed to the respective ends of the bar 1073 by clamp-plates 1095 and screws 1096. The flexible plate 1074 is fixed to the lever 1020 by clamp plates and screws 1097. The flexible plate 1075 is fixed to the fulcrum-block by clamp-plates 1098 and screws 1099. The bar 1073 being of considerable length, and being attached to the lever where its motion is but small, the resistance offered to the free vertical play of the levers is exceedingly slight.

The load to be weighed is applied to a load-stem, 1076, suspended by a nut, 1077, to a cross-head, 1078, which rests, through the medium of a buffer-spring, 1079, on a second cross-head, 1080, fastened to the case by the nuts 1081 and bolts 1019. The case is closed in front by a glazed door, 1085, secured by hinges 1086 and lock 1087. The load received by the case is communicated, through fulcrum-block 1018 and fulcrum-plate 1017, to the load-lever 1010, and thence to the column 1009, attached to the load-beam 1006, and, through the connecting-rods 1005, to the suspension-beam 1002, with a pressure which is balanced and indicated by the weights.

Whatever novel subject-matter I have set forth and not claimed or attempted to claim herein I have claimed or attempted to claim in other applications, or have reserved to be claimed in future original applications.

The following is here claimed as new:

1. The combination of the load-beam 1006, screw 1008, load-column 1009, transmitting-plate 1011, and load-lever 1010, substantially as and for the purposes set forth.

2. The combination of the load-beam 1006, load-column 1009, transmitting-plate 1011, load-lever 1010, transmitting and fulcrum plates 1021 1024, and the secondary lever 1020, graduated to serve as a weight-beam, and carrying one or more sliding weights, 1027, substantially as set forth.

3. The combination of the load-beam 1006, load-column 1009, load-lever 1010, weight-lever 1020, and secondary weight-lever 1030, substantially as and for the purposes set forth.

4. The combination of the load-beam 1006, connecting-screw 1008, load-column 1009, load-lever 1010, transmitting-plates 1011 1021 1052, graduated weight-lever 1020, with weight 1027, and the indicator-rod 1054, substantially as and for the purposes set forth.

5. The combination, with the load or weight lever 1020, of the fixing plate or bar 1073, flexibly attached to said lever, near the fulcrum end thereof, and to the bracket 1018, or other suitable part of the frame or case, for the purposes set forth.

6. The combination of the levers 1020 1030, the fulcrum-block 1029, and the adjustable stud 1037, passing freely through the said fulcrum-block and serving as a stop for the levers, as set forth.

7. The combination of the lever 1030, shouldered weight-rod 1038, and stop-piece 1043, substantially as and for the purposes set forth.

8. The case 1003, provided with pockets or boxes 1048 1050, inclosing the suspension-weights and weight-rod, substantially as set forth.

ALBERT H. EMERY.

Witnesses:
OCTAVIUS KNIGHT,
WALTER ALLEN.